(12) United States Patent
Wrigley (10) Patent No.: US 12,085,758 B1
(45) Date of Patent: Sep. 10, 2024

(54) TWIST FEED RADIO FREQUENCY POLARIZER

(71) Applicant: Lockheed Martin Corporation, Bethesda, MD (US)

(72) Inventor: Jason Stewart Wrigley, Littleton, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 281 days.

(21) Appl. No.: 17/842,951

(22) Filed: Jun. 17, 2022

Related U.S. Application Data (60) Provisional application No. 63/336,677, filed on Apr. 29, 2022.

(51) Int. Cl.
*G02B 6/27* (2006.01)

(52) U.S. Cl.
CPC .................... *G02B 6/276* (2013.01)

(58) Field of Classification Search
CPC .......... H01P 1/17; H01P 1/1661; H01P 1/165; H01P 1/173; H01P 1/2131; H01P 1/065; H01P 1/172; H01P 1/16; H01P 1/171; H01P 1/182; H01P 1/19; H01P 1/042; H01P 1/2138; H01P 1/062; H01P 1/022; H01P 1/00; H01P 1/067; H01P 1/208; H01P 1/06; H01P 1/207; H01P 1/2002; H01P 1/38; H01P 1/39; H01P 1/066; H01P 1/163; H01P 1/213; H01P 1/068; H01P 1/393; H01P 1/04; H01P 1/10; H01P 1/195; H01P 1/20; H01P 1/202; H01P 1/063; H01P 1/174; H01P 1/203; H01P 1/2084; H01P 1/2088; H01P 1/36; H01P 1/025; H01P 1/027; H01P 1/264; H01P 1/061; H01P 1/122; H01P 1/15; H01P 1/184; H01P 1/32;
(Continued)

(56) References Cited

U.S. PATENT DOCUMENTS 3,386,054 A * 5/1968 Spikula ............... H01P 1/165
333/248
3,673,522 A * 6/1972 Bastikar ............... H01P 1/16
333/209
(Continued)

OTHER PUBLICATIONS

Jazani, Ghoncheh et al., "Design Of Dual-Polarized (RHCP/LHCP) Quad-Ridged Horn Antenna With Wideband Septum Polarizer Wave Guide Feed," IET Microwaves, Antennas & Propagation, vol. 12, Iss. 9, pp. 1541-1545, 2018.

*Primary Examiner* — Andrew Jordan (57) ABSTRACT

Radio frequency (RF) polarizer feeds and associated waveguide structures having twist features are discussed herein. In one example, a first waveguide segment spans a longitudinal axis between a feed port and a twist port and includes two stacked rounded rectangular elements skewed in minor axis alignment with respect to each other and having major axes perpendicular to the longitudinal axis. A second waveguide segment spans the longitudinal axis between the twist port and a polarizer port and is coupled to the first waveguide segment at the twist port. The second waveguide segment includes first ridge elements that span longitudinally from the twist port on first opposing walls of the second waveguide segment, and second ridge elements that span longitudinally from the twist port on second opposing walls of the second waveguide segment.

20 Claims, 7 Drawing Sheets

(58) Field of Classification Search
CPC .... H01P 1/365; H01P 1/08; H01P 1/11; H01P 1/181; H01P 1/183; H01P 1/185; H01P 1/20309; H01P 1/215; H01P 1/37; H01P 1/375; H01P 1/383; H01P 3/12; H01P 3/16; H01P 3/121; H01P 3/165; H01P 3/127; H01P 3/123; H01P 3/122; H01P 3/003; H01P 3/06; H01P 3/08; H01P 3/026; H01P 3/14; H01P 3/02; H01P 3/18; H01P 3/081; H01P 3/00; H01P 3/10; H01P 3/084; H01P 3/087; H01P 3/088; H01P 3/20; H01P 11/002; H01P 11/001; H01P 11/00; H01P 11/007; H01P 11/003; H01P 5/12; H01P 5/107; H01P 5/087; H01P 5/184; H01P 5/00; H01P 5/024; H01P 5/16; H01P 5/19; H01P 5/182; H01P 5/20; H01P 5/04; H01P 5/082; H01P 5/18; H01P 5/103; H01P 5/10; H01P 5/1015; H01P 5/085; H01P 5/181; H01P 7/06; H01P 7/10; H01P 7/082; H01P 9/006; H01Q 13/02; H01Q 21/0006; H01Q 15/24; G02B 6/276
See application file for complete search history.

(56) References Cited

U.S. PATENT DOCUMENTS

| | | | | |
|---|---|---|---|---|
| 4,324,968 A * | | 4/1982 | Smith | H01P 1/195 219/748 |
| 4,343,005 A * | | 8/1982 | Han | H01Q 1/288 343/781 P |
| 4,589,728 A * | | 5/1986 | Dyott | G02B 6/2733 385/11 |
| 4,630,059 A * | | 12/1986 | Morz | H01Q 25/04 333/135 |
| 4,707,702 A * | | 11/1987 | Withers | H01Q 13/0241 343/776 |
| 4,743,918 A * | | 5/1988 | Rannou | H01P 1/17 343/895 |
| 4,825,175 A * | | 4/1989 | Tsuda | H01P 5/12 333/1.1 |
| 5,103,237 A * | | 4/1992 | Weber | H01Q 15/246 333/135 |
| 5,198,921 A * | | 3/1993 | Aoshima | G02B 6/126 385/11 |
| 5,231,529 A * | | 7/1993 | Kaede | H04B 10/2971 359/333 |
| 5,250,328 A * | | 10/1993 | Otto | C23C 16/511 118/724 |
| 5,475,772 A * | | 12/1995 | Hung | G02B 6/14 385/11 |
| 5,499,307 A * | | 3/1996 | Iwatsuka | G02B 6/272 359/489.08 |
| 5,563,616 A * | | 10/1996 | Dempsey | H01Q 9/285 343/756 |
| 5,719,499 A * | | 2/1998 | Chandrakumar | G01R 33/34007 324/322 |
| 5,801,598 A * | | 9/1998 | Tantawi | H01P 1/264 333/81 B |
| 5,859,619 A * | | 1/1999 | Wu | H01Q 19/192 343/781 CA |
| 5,905,474 A * | | 5/1999 | Ngai | H01Q 19/023 343/840 |
| RE36,506 E * | | 1/2000 | Dempsey | H01Q 9/285 343/756 |
| 6,198,452 B1 * | | 3/2001 | Beheler | H01Q 1/18 343/765 |
| 6,274,858 B1 * | | 8/2001 | Alton | H05B 6/704 219/746 |
| 6,396,037 B1 * | | 5/2002 | Rossouw | H05B 6/70 333/21 A |
| 6,426,722 B1 * | | 7/2002 | Sievenpiper | H01Q 15/10 343/909 |
| 6,426,726 B1 * | | 7/2002 | Yablon | H01Q 19/08 343/754 |
| 6,452,561 B1 * | | 9/2002 | West | H01Q 13/0258 343/786 |
| 6,501,426 B2 * | | 12/2002 | Waterman | H01Q 21/067 343/762 |
| 6,504,961 B1 * | | 1/2003 | Findakly | G02B 6/2843 385/11 |
| 6,507,323 B1 * | | 1/2003 | West | H01Q 13/0241 343/786 |
| 6,628,861 B1 * | | 9/2003 | Yao | G02B 6/2706 385/24 |
| 6,795,616 B2 * | | 9/2004 | Yao | G02B 6/2706 385/24 |
| 6,801,789 B1 * | | 10/2004 | Kato | H01Q 25/001 455/562.1 |
| 6,907,169 B2 * | | 6/2005 | Vahala | G02B 6/30 385/11 |
| 6,920,255 B2 * | | 7/2005 | Hasui | G02B 6/276 385/11 |
| 7,208,710 B2 * | | 4/2007 | Gregoire | H05B 6/704 219/746 |
| 7,224,854 B2 * | | 5/2007 | Ellwood, Jr. | G02B 6/02 385/11 |
| 7,233,720 B2 * | | 6/2007 | Yao | G02B 6/02071 385/32 |
| 7,265,558 B1 * | | 9/2007 | Penndal | G01F 23/284 324/637 |
| 7,474,173 B2 * | | 1/2009 | Avramis | H01P 1/161 333/135 |
| 7,522,274 B2 * | | 4/2009 | Salmon | G01K 11/006 356/216 |
| 7,579,984 B2 * | | 8/2009 | Wang | G01C 21/165 342/357.65 |
| 7,684,656 B2 * | | 3/2010 | Chen | G01K 11/3206 385/12 |
| 7,791,549 B2 * | | 9/2010 | Clymer | H01Q 21/0037 343/762 |
| 8,094,081 B1 * | | 1/2012 | Bruzzi | H01Q 13/0208 343/781 CA |
| 8,094,359 B1 * | | 1/2012 | Matsko | G02F 1/0356 359/239 |
| 8,134,499 B2 * | | 3/2012 | Wang | G01S 19/21 701/472 |
| 8,218,916 B2 * | | 7/2012 | Chen | G01L 19/0092 385/12 |
| 8,552,410 B2 * | | 10/2013 | Capasso | G02B 6/12 250/493.1 |
| 8,723,145 B2 * | | 5/2014 | Capasso | G02B 6/2726 250/493.1 |
| 8,754,824 B2 * | | 6/2014 | Puente | H01Q 21/065 343/893 |
| 8,836,601 B2 * | | 9/2014 | Sanford | H01Q 1/525 343/837 |
| 8,873,894 B2 * | | 10/2014 | Kim | G02B 6/00 385/2 |
| 8,995,813 B2 * | | 3/2015 | Wyss | G02B 6/105 385/127 |
| 9,397,820 B2 * | | 7/2016 | Schulz | H04K 3/822 |
| 9,450,305 B2 * | | 9/2016 | Puente | H01Q 9/0414 |
| 9,490,533 B2 * | | 11/2016 | Sanford | H01Q 15/14 |
| 9,520,637 B2 * | | 12/2016 | Monte | H04B 1/40 |
| 9,543,635 B2 * | | 1/2017 | Schulz | H01Q 19/12 |
| 9,954,265 B2 * | | 4/2018 | Shen | H01P 1/36 |
| 9,966,648 B2 * | | 5/2018 | Liu | H01Q 1/125 |
| 10,120,044 B2 * | | 11/2018 | Purea | G01R 33/345 |
| 10,135,144 B2 * | | 11/2018 | Bosshard | H01Q 1/288 |
| 10,211,519 B2 * | | 2/2019 | Puente | H01Q 21/065 |
| 10,310,185 B1 * | | 6/2019 | Lin | G02B 6/126 |
| 10,502,898 B2 * | | 12/2019 | Kopp | G02B 6/274 |
| 10,557,989 B1 * | | 2/2020 | Jacob | G02B 6/276 |
| 10,627,574 B2 * | | 4/2020 | Lin | G02B 6/276 |

(56) References Cited

U.S. PATENT DOCUMENTS

| | | | |
|---|---|---|---|
| 10,641,956 B1* | 5/2020 | Bian | G02B 6/43 |
| 10,677,987 B1* | 6/2020 | Dumais | G02B 6/276 |
| 10,823,775 B2* | 11/2020 | Anderson | G01R 29/0878 |
| 10,828,606 B2* | 11/2020 | Mitra | B01D 61/366 |
| 10,910,699 B2* | 2/2021 | Puente | H01Q 1/42 |
| 10,923,792 B2* | 2/2021 | Chang | H05K 1/024 |
| 11,092,740 B1* | 8/2021 | Bian | G02B 6/126 |
| 11,092,745 B1* | 8/2021 | Younce | G02B 6/2793 |
| 11,094,510 B2* | 8/2021 | Philipp | H01J 27/205 |
| 11,099,327 B2* | 8/2021 | Lin | G02B 6/126 |
| 11,183,770 B2* | 11/2021 | Gleason | H01Q 21/065 |
| 11,199,661 B2* | 12/2021 | Puckett | G02B 6/122 |
| 11,360,135 B2* | 6/2022 | Anderson | G01R 29/0878 |
| 11,409,044 B2* | 8/2022 | Su | G02B 6/2773 |
| 11,424,538 B2* | 8/2022 | Mitchelson | H01Q 19/193 |
| 11,520,157 B2* | 12/2022 | Little | G02B 27/286 |
| 11,543,659 B2* | 1/2023 | Schultz | G02B 6/0016 |
| 11,579,367 B2* | 2/2023 | Zhang | G02B 6/276 |
| 11,644,620 B2* | 5/2023 | Bian | G02B 6/125 385/11 |
| 11,662,521 B2* | 5/2023 | Lin | G02B 6/126 385/11 |
| 11,740,464 B2* | 8/2023 | Hudman | G02B 27/283 359/489.07 |
| 11,742,577 B2* | 8/2023 | Mitchelson | H01Q 19/193 343/840 |
| 11,774,482 B2* | 10/2023 | Anderson | G01R 29/0878 324/300 |
| 11,844,650 B1* | 12/2023 | Davis | G01N 29/0654 |
| 11,881,607 B1* | 1/2024 | Wrigley | H01P 1/161 |
| 11,909,087 B2* | 2/2024 | Sanford | H01P 1/208 |
| 2002/0163469 A1* | 11/2002 | Waterman | H01Q 21/064 343/846 |
| 2003/0081903 A1* | 5/2003 | Vahala | G02B 6/274 385/11 |
| 2003/0174922 A1* | 9/2003 | Hasui | G02B 6/264 385/11 |
| 2004/0037495 A1* | 2/2004 | Yao | G02B 6/02195 385/27 |
| 2005/0041922 A1* | 2/2005 | Yao | G02B 6/276 385/11 |
| 2005/0174919 A1* | 8/2005 | Chang | G02B 27/283 369/112.16 |
| 2005/0201655 A1* | 9/2005 | Ellwood | G02B 6/276 385/11 |
| 2006/0102622 A1* | 5/2006 | Gregoire | H05B 6/70 219/695 |
| 2006/0289503 A1* | 12/2006 | Gregoire | H05B 6/704 219/695 |
| 2007/0065551 A1* | 3/2007 | Alton | A23B 4/012 426/521 |
| 2007/0095823 A1* | 5/2007 | Sedlmayr | H05B 6/72 219/688 |
| 2007/0118286 A1* | 5/2007 | Wang | G01S 19/47 342/357.65 |
| 2007/0121103 A1* | 5/2007 | Salmon | G01K 11/006 374/E11.003 |
| 2007/0296518 A1* | 12/2007 | Avramis | H01P 1/161 333/135 |
| 2008/0159692 A1* | 7/2008 | Yao | G02B 6/276 385/28 |
| 2008/0212917 A1* | 9/2008 | Chen | G01D 5/35354 385/12 |
| 2009/0134152 A1* | 5/2009 | Sedlmayr | H05B 6/806 219/687 |
| 2009/0290147 A1* | 11/2009 | MacDougall | G01D 5/35383 356/477 |
| 2010/0072195 A1* | 3/2010 | Alton | H05B 6/707 219/757 |
| 2010/0135608 A1* | 6/2010 | Chen | G01L 11/025 385/12 |
| 2011/0169689 A1* | 7/2011 | Wang | G01C 21/165 342/357.3 |
| 2011/0315898 A1* | 12/2011 | Capasso | G02B 6/105 250/492.1 |
| 2012/0002973 A1* | 1/2012 | Bruzzi | H01Q 13/0208 343/781 R |
| 2013/0071060 A1* | 3/2013 | Kim | G02B 6/126 385/11 |
| 2013/0315525 A1* | 11/2013 | Wyss | G02B 6/2726 385/11 |
| 2014/0016895 A1* | 1/2014 | Capasso | G02B 6/12 385/11 |
| 2014/0057576 A1* | 2/2014 | Monte | H01Q 1/125 343/762 |
| 2014/0139386 A1* | 5/2014 | Liu | H04B 1/40 343/781 CA |
| 2014/0218255 A1* | 8/2014 | Sanford | H01Q 15/16 343/837 |
| 2014/0219142 A1* | 8/2014 | Schulz | H04L 5/14 370/280 |
| 2014/0220903 A1* | 8/2014 | Schulz | H01Q 21/28 343/837 |
| 2015/0002357 A1* | 1/2015 | Sanford | H01Q 15/16 343/836 |
| 2016/0149283 A1* | 5/2016 | Shen | H01P 1/36 333/135 |
| 2016/0195593 A1* | 7/2016 | Purea | G01N 24/08 324/322 |
| 2016/0218406 A1* | 7/2016 | Sanford | H01P 1/208 |
| 2016/0315391 A1* | 10/2016 | Bosshard | H01Q 21/064 |
| 2017/0333258 A1* | 11/2017 | Trennepohl | A61F 13/20 |
| 2018/0231651 A1* | 8/2018 | Charvat | G01S 7/282 |
| 2018/0269554 A1* | 9/2018 | Sanford | H01P 1/208 |
| 2019/0118143 A1* | 4/2019 | Mitra | B01D 61/366 |
| 2019/0159302 A1* | 5/2019 | Avram | H05B 6/6408 |
| 2019/0187198 A1* | 6/2019 | Anderson | G01R 29/0878 |
| 2019/0198963 A1* | 6/2019 | Zhuo | H01P 5/18 |
| 2020/0018903 A1* | 1/2020 | Lin | G02B 6/126 |
| 2020/0264373 A1* | 8/2020 | Lin | G02B 6/126 |
| 2020/0295424 A1* | 9/2020 | Sanford | H01P 7/06 |
| 2020/0313268 A1* | 10/2020 | Chang | H01P 3/12 |
| 2020/0357614 A1* | 11/2020 | Philipp | H05H 7/08 |
| 2020/0365998 A1* | 11/2020 | Gleason | H01Q 3/2676 |
| 2020/0371281 A1* | 11/2020 | Schultz | G02B 6/0016 |
| 2021/0048465 A1* | 2/2021 | Anderson | G01R 29/0878 |
| 2021/0116635 A1* | 4/2021 | Puckett | G02B 6/14 |
| 2021/0157159 A1* | 5/2021 | Little | G02B 27/281 |
| 2021/0247612 A1* | 8/2021 | Hudman | G02B 5/18 |
| 2021/0255405 A1* | 8/2021 | Younce | G02B 6/2793 |
| 2021/0265740 A1* | 8/2021 | Mitchelson | H01Q 5/47 |
| 2021/0341675 A1* | 11/2021 | Su | G02B 6/2766 |
| 2021/0364701 A1* | 11/2021 | Lin | G02B 6/276 |
| 2022/0252783 A1* | 8/2022 | Zhang | G02B 6/1228 |
| 2022/0278460 A1* | 9/2022 | Iluz | H01Q 21/24 |
| 2022/0326289 A1* | 10/2022 | Anderson | G01R 29/0878 |
| 2022/0334313 A1* | 10/2022 | Su | G02B 6/12004 |
| 2022/0352631 A1* | 11/2022 | Mitchelson | H01Q 1/24 |
| 2022/0373738 A1* | 11/2022 | Bian | G02B 6/125 |
| 2022/0382061 A1* | 12/2022 | Schultz | G02B 6/0075 |
| 2023/0057530 A1* | 2/2023 | Shmuel | H01Q 3/14 |
| 2023/0268657 A1* | 8/2023 | Merk | H01Q 15/242 343/756 |
| 2023/0375787 A1* | 11/2023 | Montfort | G02B 27/4261 |
| 2023/0375842 A1* | 11/2023 | Hudman | G02B 27/0172 |
| 2024/0045146 A1* | 2/2024 | Islam | G02B 6/124 |
| 2024/0145894 A1* | 5/2024 | Sanford | H01Q 1/42 |

* cited by examiner

TWIST FEED RADIO FREQUENCY POLARIZER

RELATED APPLICATIONS

This application hereby claims the benefit and priority to U.S. Provisional Application No. 63/336,677, entitled "TWIST FEED RADIO FREQUENCY POLARIZER," and filed Apr. 29, 2022, which is hereby incorporated by reference in its entirety.

BACKGROUND

Various radio frequency (RF) waveguide-based structures are employed in wireless transmission systems that communicate over microwave bands. For example, polarizers can be employed in microwave feed networks which convert polarizations of signals between linear and circular polarizations, and vice-versa. Polarizers are often employed in satellite communication system feed structures for communication uplinks and downlinks that can be arranged into steerable arrays of horn antennas. However, waveguides and associated polarizers can be difficult to design and manufacture due in part to the high sensitivity of feed structures and waveguides to manufacturing precision, symmetry, and geometric configurations which can lead to distortions like passive intermodulation. Moreover, the polarizer structure itself can have bandwidth limitations related to particular geometries and manufacturing techniques. This has led to creation of many styles of polarizers and microwave horn antenna feed networks of varying complexity.

One such polarizer is the pinch polarizer which generates circularly polarized outputs from linearly polarized source signals. A pinch polarizer includes a waveguide structure having a dimple or 'pinch' along its length which alters the signal polarization using the geometry of the associated waveguide. Manufacturing of pinch polarizers can be achieved using a combination of conventional machining techniques and post-processing, such as forming the waveguide on a lathe followed by a mechanical compression to form the pinch feature. While the pinch polarizer comprises a single workpiece, the achievable bandwidth and axial ratio are limited, and the feasible types of manufacturing techniques are restricted due to the 'undercuts' presented in the waveguide by the pinch feature. Moreover, the pinch polarizer has a circular cross-sectional shape and couples to a corresponding horn element which is also circular in cross-section, leading to lower spatial and RF efficiency when deployed into large arrays of horns.

Other polarizers involve lateral corrugations or teeth formed in a waveguide to generate the desired polarization properties. A corrugated polarizer feed achieves better axial ratio performance and a higher bandwidth than a pinch polarizer, however, the feasible types of manufacturing techniques are also restricted due to the undercuts presented by the corrugations. Also, corrugated polarizer feeds are typically high complexity and high mass, even if a greater efficiency is achieved in arrays due to the corresponding square horn shape.

OVERVIEW

Discussed herein are enhanced wide bandwidth polarizers for microwave RF feed networks and manufacturing techniques for such polarizers. These polarizers can be manufactured from a single workpiece using direct machining techniques, or may instead be manufacturing using various additive or injection molding manufacturing techniques. This leads to a large reduction in manufacturing complexity, cost, and mass—while simultaneously increasing performance characteristics with relation to other types of polarizers. A direct-machined polarizer having a wide bandwidth is not found among the prior examples.

In one example, an apparatus is provided having a first waveguide segment spanning a longitudinal axis between a feed port and a twist port. The first waveguide segment comprises two stacked rounded rectangular elements skewed in minor axis alignment with respect to each other and having major axes perpendicular to the longitudinal axis. A second waveguide segment is provided spanning the longitudinal axis between the twist port and a polarizer port and coupled to the first waveguide segment at the twist port. The second waveguide segment comprises first ridge elements that span longitudinally from the twist port on first opposing walls of the second waveguide segment, and second ridge elements that span longitudinally from the polarizer port on second opposing walls of the second waveguide segment.

In another example, a method of manufacturing is presented. The method includes forming a first waveguide segment spanning a longitudinal axis between a feed port and a twist port, wherein the first waveguide segment comprises two stacked rounded rectangular elements skewed in minor axis alignment with respect to each other and having major axes perpendicular to the longitudinal axis. The method also includes forming a second waveguide segment spanning the longitudinal axis between the twist port and a polarizer port and coupled to the first waveguide segment at the twist port, wherein the second waveguide segment comprises first ridge elements that span longitudinally from the twist port on first opposing walls of the second waveguide segment, and second ridge elements that span longitudinally from the twist port on second opposing walls of the second waveguide segment.

In yet another example, a radio frequency feed structure includes a horn element coupled to a polarizer port of a polarizer feed and establishing a horn aperture, and a coaxial feed element coupled to a feed port of the polarizer feed and configured to interface between a coaxial link and a waveguide of the polarizer feed. The polarizer feed comprises a first waveguide segment spanning a longitudinal axis between the feed port and a twist port, wherein the first waveguide segment comprises two stacked rounded rectangular elements skewed in minor axis alignment with respect to each other and having major axes perpendicular to the longitudinal axis. The polarizer feed also comprises a second waveguide segment spanning the longitudinal axis between the twist port and the polarizer port and coupled to the first waveguide segment at the twist port, wherein the second waveguide segment comprises first ridge elements that span longitudinally from the twist port on first opposing walls of the second waveguide segment, and second ridge elements that span longitudinally from the twist port on second opposing walls of the second waveguide segment.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Polarizers can be deployed in microwave RF feed networks to convert polarizations of signals between linear and circular polarizations, and vice-versa. Linear vertical (or linear horizontal) polarization typically refers to a single electromagnetic signal propagating in a single plane along the direction of propagation, while circular polarization includes two linear components that are perpendicular to each other and having a phase difference of 90° ($\pi/2$). Other polarizations are possible, such as elliptical. Often, feed networks with polarizers are coupled to horn antennas and reflectors used for transmitting or receiving microwave communications. While individual antennas can be employed, often large arrays of horn antennas, perhaps using hundreds of elements, can form electronically steerable arrays (ESAs) for satellite communications, terrestrial backbone communications, aircraft communications, radar systems, and other various applications. Conversion of polarizations of signals in such communication systems can enable more effective communications between endpoints having varied or unpredictable orientations. For example, it can be helpful to use circular polarization to communicate from a satellite to ground stations, aircraft, or vehicles.

The examples discussed herein comprise polarizer feed structures and manufacturing techniques that generate circular polarization from single linear polarization inputs in communication applications with a compact equipment envelope and with low mass. Moreover, various manufacturing techniques can be employed, including machining, injection molding, or 3D printing, among others. When injection molding or casting techniques are employed to manufacture polarizers or associated horn structures, draft angles are included to slope cross-sectional areas along certain axes. These draft angles are typically a requirement of the manufacturing tooling or process to prevent material overhangs or parallel surfaces in order to release the workpiece from a mold or die.

While the examples herein cover portions of the RF microwave Ku, K, or Ka bands (approximately 12 to 40 GHz), other examples might include the X band (approximately 8 to 12 GHz). It should be understood that various communication bands and frequencies can be employed for the equipment discussed herein, with corresponding geometry scaling to suit the frequency ranges. For example, the equipment can support a frequency range corresponding to the Institute of Electrical and Electronics Engineers (IEEE) bands of S band, L band, C band, X band, Ku band, K band, Ka band, V band, W band, among others, including combinations thereof. Other example RF frequency ranges and service types include ultra-high frequency (UHF), super high frequency (SHF), extremely high frequency (EHF), or other parameters defined by different organizations.

Additionally the polarizer feeds and associated horn antennas can utilize a circular cross-sectional aperture shape, or may instead employ other cross-sectional shapes, such as a square. A square aperture can provide higher spatial density and performance when many horns are employed in an array environment. However, circular, square, rectangular, triangular, hexagonal, or irregular horn antennas can be employed using similar techniques discussed herein. Also, flanges used for connections or bolting among various components of an RF system are shown in some of the examples herein. It should be understood that these flanges can be omitted or altered to suit the particular application.

Materials employed for the elements of the polarizers or horn antennas or any of the polarizer feeds discussed herein can include any machinable and conductive material, such as aluminum, magnesium alloys, copper, and other suitable metals or metal allows. Non-conductive materials can be employed if RF-contacting surfaces are coated or treated with conductive layers, such as copper, aluminum, silver, gold, or similar plating. In the alternative, injection-moldable materials can be used, such as plastics, polymers, carbon composites, polyamide, acrylic, polycarbonate, polyoxymethylene, polystyrene, acrylonitrile butadiene styrene (ABS), polypropylene, polyethylene, polyurethane, thermoplastic rubber, including combinations thereof. Additionally, various additives can be included in the injected material, such as stabilizers, glass or organic fibers, structural elements, lubricants, mold release agents, or other additives. The material can be injected via at least one port into a mold or die which forms the shapes and cavities of the associated elements. Once formed, conductive surface treatments are typically applied at least to surfaces in contact with RF signals. These conductive surface treatments include various platings, including conductive materials, metallic substances, metals, metal alloys, and the like, such as those mentioned above including aluminum, copper, silver, gold, or other similar metals or associated combinations.

Figure 1:
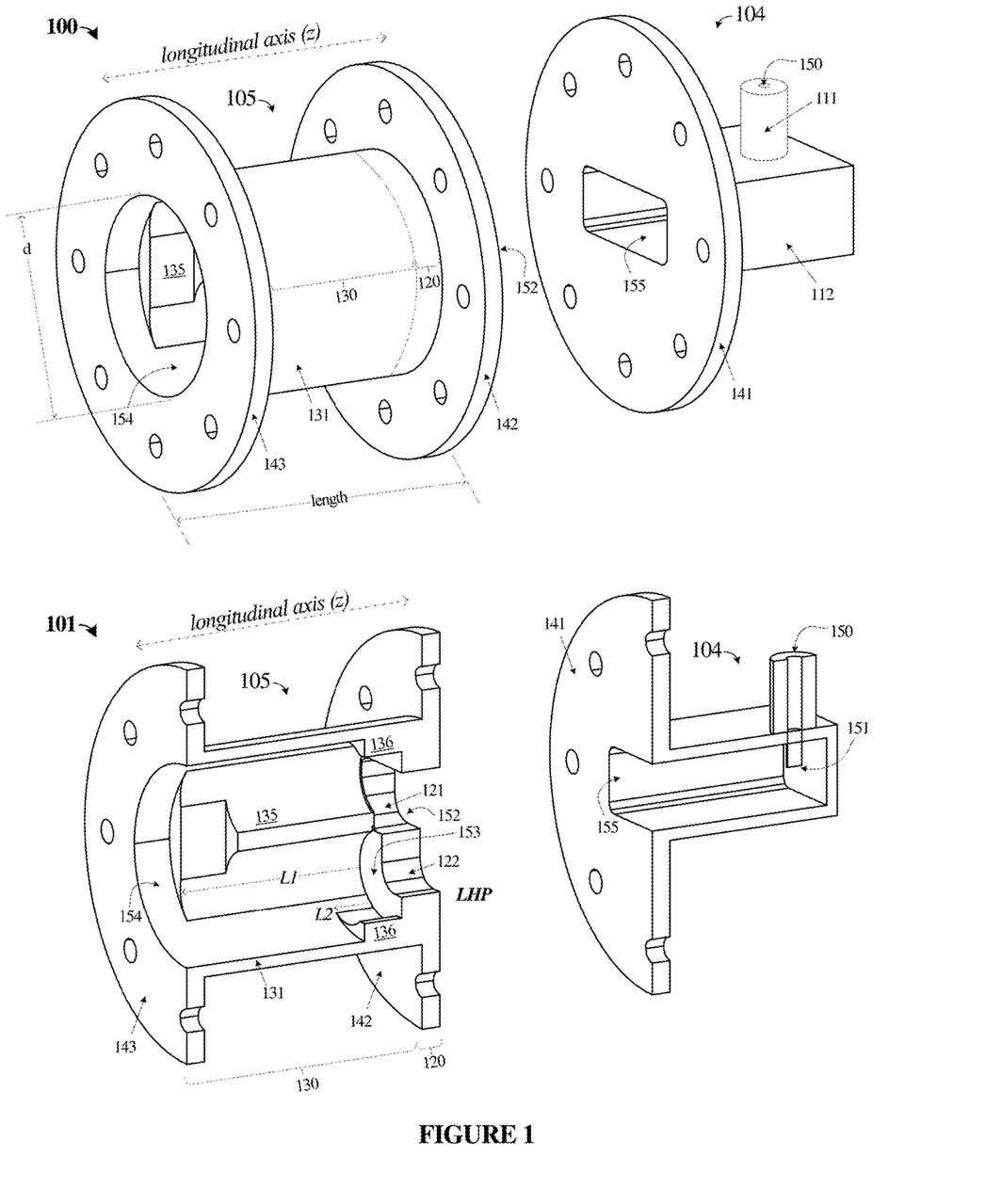
FIG. 1 illustrates external and cross-sectional views of a feed system in an implementation.
Figure 2:
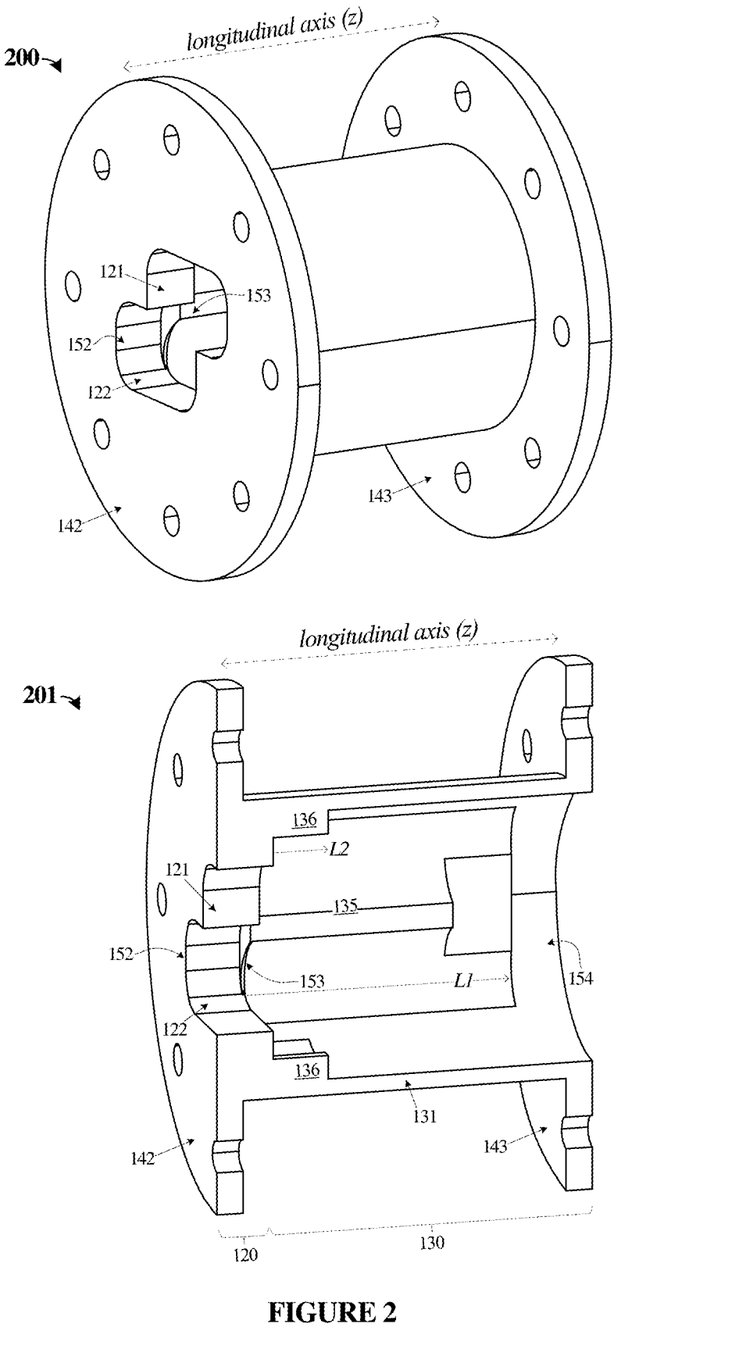
FIG. 2 illustrates external and cross-sectional views of a polarizer feed in an implementation.

Turning now to a first example twist polarizer feed, FIGS. 1 and 2 are presented. FIG. 1 illustrates isometric view 100 and cross-sectional view 101 of polarizer feed 105 and coaxial launch element 104 in an implementation. Cross-sectional view 101 is sectioned at centerlines of the top/bottom waveguide walls 131 along longitudinal axes of polarizer feed 105 and coaxial launch element 104. FIG. 2 illustrates isometric view 200 and cross-sectional view 201 of polarizer feed 105 in an implementation.

Polarizer feed 105 comprises two segments 120 and 130. Feed port 152 is at a first longitudinal end of polarizer feed 105 and polarizer port 154 is at a second longitudinal end of polarizer feed 105. A generally longitudinal waveguide cavity spans the length of polarizer feed 105 and carries RF energy from feed port 152 to polarizer port 154 during transmit operations. Receive operations have RF energy carried from polarizer port 154 to feed port 152. Feed port 152 typically couples to a waveguide interface that further couples over waveguides or coaxial conductive links to RF transmit/receive circuitry. Polarizer port 154 typically couples to a horn antenna element or other directional antenna element to guide the RF energy to/from polarizer feed 105 with respect to free-space propagation. An example length of polarizer feed 105 is 0.70" and a diameter of polarizer port 154 is 0.51" for a frequency range centered on approximately 25 GHz. Other lengths and diameters are possible to suit other frequency ranges.

Segment 120 includes a first waveguide portion comprising a longitudinal cavity surrounded by cavity walls 131. Segment 120 spans a longitudinal axis between feed port 152 and twist port 153. Twist port 153 interfaces between segment 120 and segment 130. Segment 120 comprises two stacked rounded rectangular elements 121-122 skewed in minor axis alignment with respect to each other and having major axes perpendicular to the longitudinal axis. In other words, rectangular elements 121-122 form a rounded 'Z' cavity or 'S' cavity, when viewed end-on. This cavity shape produces a "twist" in the RF energy, establishing a roughly equal power split between orthogonal modes that are introduced into segment 130. A generally equal energy/power split between horizontal/vertical propagation modes established by rectangular elements 121-122 at port 153 with respect to a single propagation mode at port 152. Segment 120 can include a waveguide interface flange and associated bolt/fastener features to transition port 152 to a standardized waveguide type or size, such as WR-34, or to provide a structural mount for polarizer feed 105. In this example, segment 120 includes flange 142 for coupling to flange 141 of coaxial launch 140. Segment 120 can comprise a ¼ wavelength (λ) transformer to a rectangular waveguide (e.g. WR-34 or WR-42). Other standardized waveguide types can couple to the waveguide interface flange, such as ridged waveguides (e.g. WR-42 or WRD-580).

Segment 130 includes a second waveguide segment comprising a longitudinal cavity surrounded by cavity wall 131. Segment 130 spans the longitudinal axis between twist port 153 and polarizer port 154. Twist port 153 interfaces between segment 120 and segment 130. Segment 130 comprises first ridge elements 135 that span longitudinally from twist port 153 on first opposing walls of segment 130, and second ridge elements 136 that span longitudinally from twist port 153 on second opposing walls of segment 130. Segment 130 also includes flange 143 in this example. Flange 143, which includes several bolt/fastener features, might be employed to couple to a horn antenna element, filters structures, or other RF elements and waveguide structures.

As mentioned, waveguide wall ridges 135-136 are included in waveguide segment 130. Waveguide wall ridges 135-136 are located on top/bottom walls and left/right (side) walls of segment 130 and centered on corresponding waveguide wall 131. While waveguide wall ridges 135-136 are not necessary to be centered on the associated side/top/bottom walls of segment 130, the effectiveness of the ridges can be affected by placement away from center. Waveguide wall ridges 135-136 extend from twist port 153 along a longitudinal axis of segment 130 for selected lengths. Side ridges 135 can have a corresponding length L1, and top/bottom ridges 136 can have a corresponding length L2. Typically, L1 and L2 are selected to be a different length. L1 can be selected to achieve to a target phase shift among propagation modes transiting segment 130, such as a 90° phase shift, and L2 selected to achieve a target impedance. The phase shift is applied to the generally equal power split between horizontal/vertical propagation modes established by rectangular elements 121-122. A generally trapezoidal shape with tapers, fillets, or chamfers along longitudinal edges is employed for waveguide wall ridges 135-136 in FIGS. 1 and 2, although variations are possible, such as triangular, half-circular, half-elliptical, or other shapes. The wide fillets shown in FIGS. 1 and 2 support the use of an end mill process to machine out material from a circular stock workpiece and form segment 130 with ridges. A step-down termination of waveguide wall ridges 135-136 to the side walls of segment 130 is formed at corresponding lengths L1/L2 for each of waveguide wall ridges 135-136, although a full taper to the side walls might be included if supported by the manufacturing process.

One example manufacturing process to form polarizer feed 105 is to perform end milling or direct machining of a workpiece. The "twist" section provided by rectangular elements 121-122 can be end milled from a longitudinal end proximate to rectangular elements 121-122, and a polarizer cavity forming section 130 can be end milled from a longitudinal end proximate to polarizer port 154. Waveguide wall ridges 135-136 are formed having large fillets from the ridge peak to waveguide wall 131 to allow for end milling processes while still generating the phase shift necessary for circular polarization. Reflections within section 130 are utilized to flatten out the phase differential between the two orthogonal components of the circularly polarized signals, with the twist section controlling the power split between the two orthogonal components and also serves as a matching element for mating with standard coaxial launches coupled at feed port 152. With such a configuration, bandwidths up to 35% or 45% are readily achieved while providing manufacturing flexibility to fully use direct machining. Other techniques, such as injection molding, electrical discharge machining (EDM), or additive manufacturing can also be employed if desired.

Coaxial launch element 104 is also shown in FIGS. 1 and 2. Although optional, coaxial launch element 104 is shown as an example upstream RF element to which polarizer feed 105 can be coupled on a first longitudinal end. Flange 141 of coaxial launch element 104 can be employed to couple coaxial launch element 104 to flange 142 of polarizer feed 105. Coaxial launch element 104 interfaces between conductive coaxial link 111 having center conductor 150 that interfaces RF energy with waveguide cavity 112 at RF transition 151. Waveguide cavity 112 has a port adjacent to feed port 152 that can conform to a standardized waveguide flange or opening, such as EIA Standard WR-34, among others. This waveguide opening has a rectangular cross-section, and abuts the void creating segment 120 by rectangular elements 121-122. Thus, RF energy to/from waveguide cavity 112 is introduced (or received) into polarizer segment 130 with rectangular elements 121-122. While coaxial launch element 104 might be manufactured with segments 120 and 130, in many cases this is a pre-manufactured part, and can be provided from a vendor. Coaxial launch element 104 can provide interfacing with a 50 ohm coax to a WR-34 waveguide with flange, among other configurations. While a top launch coaxial connector is shown in FIG. 1, other launch configurations can be employed, such as bottom or end launch.

Taking a transmission example having RF energy supplied by a coaxial link 111, first, a transverse electromagnetic wave (TEM) mode on coaxial link excites a TE10 mode (transverse electric) in waveguide cavity 112. Waveguide cavity 112 excites the twist section formed by rectangular elements 121-122 that establishes TE11 vertical (V) and TE11 horizontal (H) modes in circular segment 130. Side ridges in segment 130 produce phase shifts among the vertical and horizontal modes as well as maintain target impedance seen at port 153. Typically the longer side ridges (135) produce the phase shifts and the short ridges maintain the impedance, but each contribute somewhat to each characteristic. The bandwidth achieved by polarizer feed 105 arises in part from reflections in circular segment 130, and these reflections help flatten phase differential between V and H phases. Also, the sizing of polarizer port 154 helps ensure the TE01 and TM11 modes are in cutoff to enhance performance. A receive example can proceed along similar lines, albeit in a reverse order.

Figure 3:
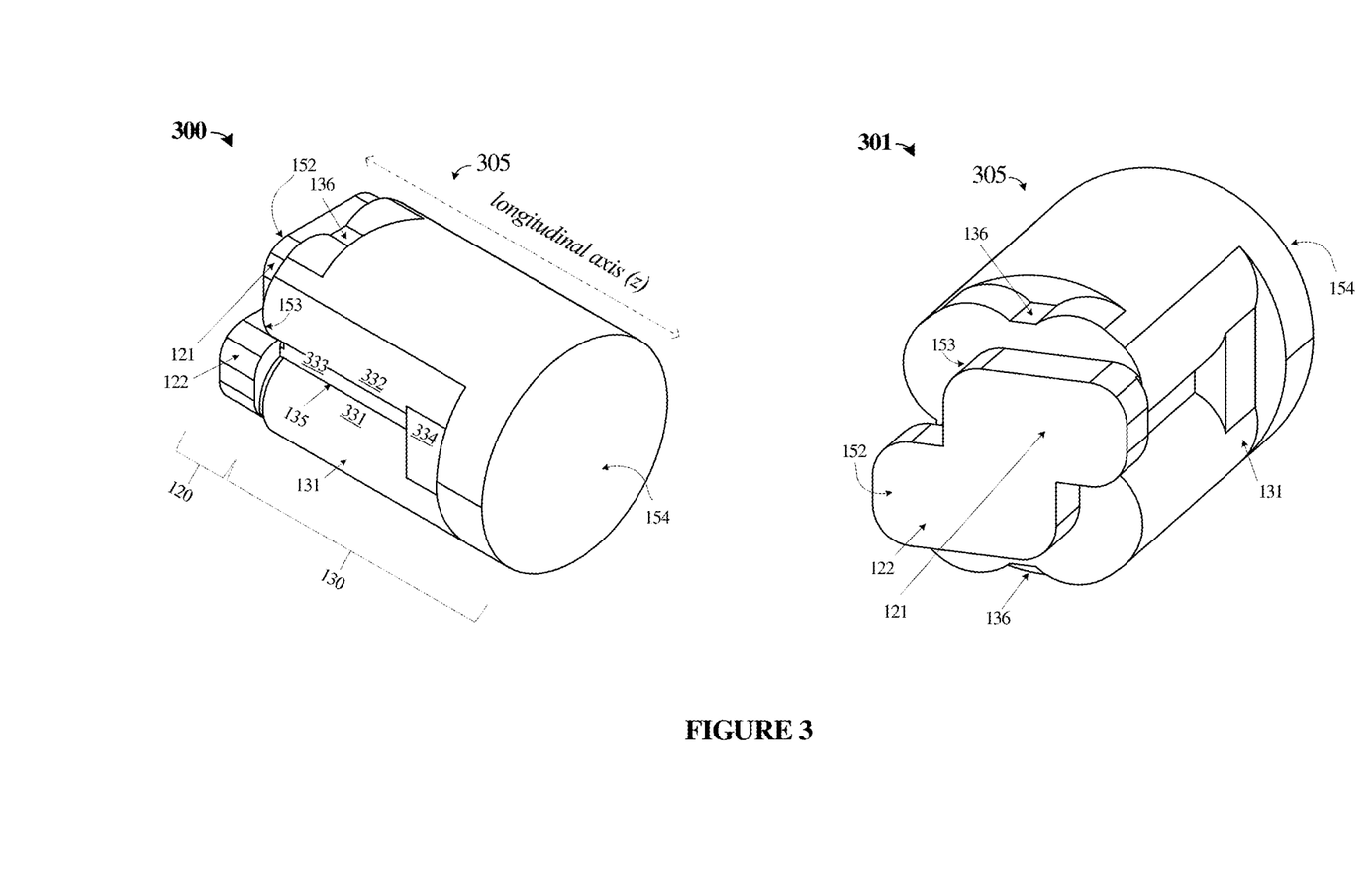
FIG. 3 illustrates cavity views of a polarizer feed in an implementation.

FIG. 3 illustrates additional views of polarizer feed 105 in an implementation. FIG. 3 includes isometric views 300-301. Instead of showing the material or waveguide components that comprise feed 105, the views of FIG. 3 show RF air cavities or internal spaces of the corresponding waveguides to illustrate internal features hidden from view in FIG. 1. Thus, the elements of FIG. 3 are not materials, but voids formed by the elements found in FIG. 1. Common labeling is used from FIG. 1 to highlight corresponding features. Specifically, segments 120 and 130 include similar elements discussed in FIG. 1, such as elements 121-122.

View 300 and 301 also show the ridged features of segment 130, namely waveguide ridges 135-136. Waveguide ridges 135 include similar features as waveguide ridges 136, with waveguide ridges being of a shorter length. Thus, the discussion on waveguide ridge features will focus on waveguide ridges 135. As seen in view 301, waveguide ridges 135 include central ridge 333 having filleted longitudinal edges 331-332. As mentioned, the filleted edges not only transition smoothly from the ridge peak to the waveguide walls, but also provide for end milling operations to form segment 130. Also included on waveguide ridges 135 is termination step 334. Termination step 334 transitions from a longitudinal end of waveguide ridges 135 to the waveguide walls. Although one step is shown, more than one might be included. Termination step 334 reduces a height of waveguide ridges 135 from an initial height at central ridge 333 to ultimately merge with the associated surfaces (e.g., ceiling/floor) of the waveguide. The quantity, length, and configuration of the step features on all waveguide wall ridges can be selected based on application and target performance characteristics for polarizer feed 105.

Upper/lower waveguide ridges 136 have length L2 (seen in FIG. 1), and this comprises a length short enough to maintain a target power split and impedance properties of polarizer feed 105. For example, length L2 and the quantity or configuration of transition steps down to the associated waveguide wall can be selected to transition to the wall of the waveguide after a target power split is achieved by the waveguide wall ridges (i.e. equal power split between horizontal/vertical propagation modes). The power split is initiated by segment 120 and then maintained by at least in part by physical symmetry among the four ridges proximate to twist port 153, and then this symmetry is broken along the longitudinal length of waveguide 131 (e.g. at L2). In this example, an equal power split is achieved by having all four waveguide wall ridges run to and be flush with the backwall of waveguide 131 at twist port 153 and begin at approximately equal depths into the cavity volume of waveguide 131 (i.e, ridge height of central ridge 333). This configuration can be seen in end view 301 where ridges 135-136 each extend to similar depths from the walls towards the centerline of the waveguide.

Side waveguide ridges 135 extend longitudinally until length L1 (seen in FIG. 1) to establish a difference in longitudinal length among ridges, namely between top/bottom waveguide wall ridges 136 at L2 and side waveguide wall ridges 135 at L1. Thus, a first set of opposing waveguide wall ridges is established by ridges 135 and a second set of opposing waveguide ridges is established by ridges 136. The difference in longitudinal length between the two opposing sets of waveguide wall ridges generates a target phase shift between propagation modes (e.g., 90° phase shift between horizontal/vertical propagation modes). A first set of two opposing ridges (136) step down after a launch section leaving a second set of opposing ridges (135) to generate a phase shift in a signal transiting segment 130. In this manner, the 90° phase shift for circular polarization is generated. This use of the two sets of opposing waveguide ridges avoids the need for corrugations or dimples along the length of segment 130. To further describe the waveguide wall ridges, rectangular elements 121-122 establish a power split and impedance properties at internal port 153, while all four side ridges maintain this power split for a length until one opposing set of wall ridges continues for a longer longitudinal length than the other set of opposing wall ridges (before tapering down to the wall). When twist port 153 is driven with a single propagation mode, two modes are resultantly established at polarizer port 154, each mode having a 90° difference in phase. L1 can thus be selected to achieve this target phase shift, at which point side waveguide wall ridges 135 terminate by transitioning to the walls of the waveguide.

The enhanced structures and features of polarizer feeds and corresponding interfacing elements or horn antenna elements have the flexibility to be manufactured using any desired manufacturing approach, including electrical discharge machining (EDM), direct machining, additive/3D printing, or injection molding. When a direct machining process is employed, end milling of a single workpiece, such as stock piece of metal of appropriate length, can be performed at two longitudinal ends. This end milling can form features of both segments 120 and 130, including rectangular elements 121-122 and waveguide wall ridges 135-136. When an injection molding or casting process is employed, geometry incorporating draft angles corresponding to the selected molding or casting technique is employed, and can be formed from a single workpiece or molded piece of material. In some manufacturing scenarios, a reflection or change in draft angles corresponding to a different tooling pull or extraction directions can be employed to form the single part/piece. For example, tooling used to form a first portion is pulled (or extracted) in a first direction, and tooling used to form a second portion is pulled (or extracted) in a second direction. The direction of draft angles for interior features (e.g. ridges) are typically mirrored or opposite from draft angles for exterior features (e.g. waveguide walls). This change in draft angle direction accommodates mold elements (e.g. die or mandrel) inserted into cavities during an injection molding process. Thus, external features will generally increase in size/diameter, while internal features will generally decrease in size/diameter over the pull direction.

Figure 4:
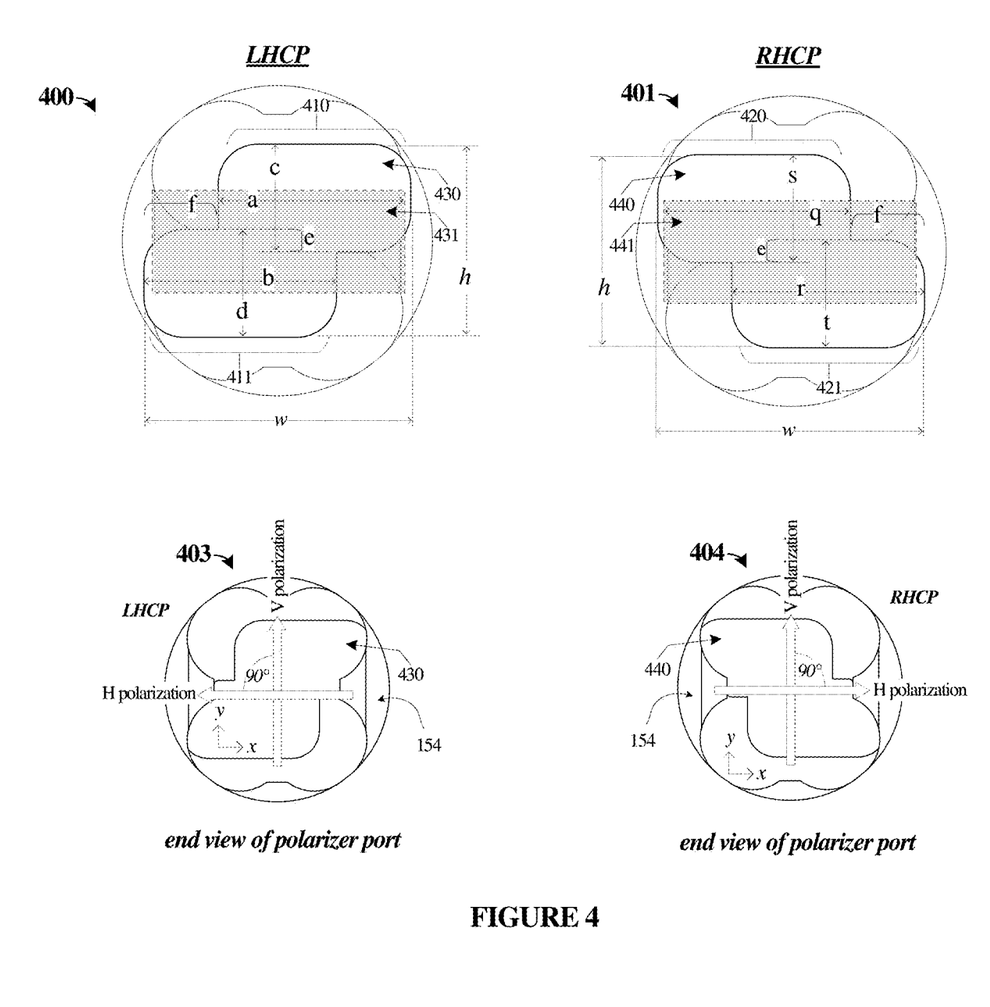
FIG. 4 shows cross-sectional views of a segment of a polarizer feed in an implementation.

To further illustrate examples of the "twist" section formed by rectangular elements 121-122 as well as ports 152 and 155, FIG. 4 is presented. FIG. 4 includes a first rectangular section and a second rectangular section which are merged to form a common void. Each rectangular section has a major axis defined along the 'long' edge of the corresponding rectangular section and a minor axis defined along the 'short' edge of the corresponding rectangular section.

Specifically, view 400 shows a first twist configuration corresponding to a left-hand circular polarization (LHCP) formed from first rectangular section 410 and second rectangular section 411. First rectangular section 410 has major axis 'a' and minor axis 'c', and second rectangular section 411 has major axis 'b' and minor axis 'd'. First rectangular section 410 and second rectangular section 411 are merged along a portion of a long side forming a generally 'Z' shape in view 400 having total width 'w' and height 'h'. The amount of vertical overlap between sections 410-411 is shown by dimension 'e' and the amount of horizontal skew between section 410-411 is shown by dimension 'f'. Thus, the twist configuration in view 400 forms a waveguide segments comprising two stacked rounded rectangular elements skewed in minor axis alignment with respect to each other and having major axes perpendicular to the longitudinal axis. Feed waveguide 431 is shown superimposed as a gray rectangular shape (e.g, conforming to WR-34 standards) onto twist shape 430 formed from sections 410-411.

Specifically, view 401 shows a second twist configuration corresponding to a right-hand circular polarization (RHCP) formed from third rectangular section 420 and fourth rectangular section 421. Third rectangular section 420 has major axis 'q' and minor axis 's', and fourth rectangular section 421 has major axis 'r' and minor axis 't'. Third rectangular section 420 and fourth rectangular section 421 are merged along a portion of a long side forming a generally 'S' shape in view 401 having total width 'w' and height 'h'. The amount of vertical overlap between sections 420-421 and the amount of horizontal skew between section 420-421 is similar to that shown in view 401, albeit in a different skew direction. Thus, the twist configuration in view 401 forms a waveguide segments comprising two stacked rounded rectangular elements skewed in minor axis alignment with respect to each other and having major axes perpendicular to the longitudinal axis. Feed waveguide 441 is shown superimposed as a gray rectangular shape (e.g., conforming to WR-34 standards) onto twist shape 440 formed from sections 420-321.

The skew direction manufactured for twist shapes 430 and 440 results in a selected power split horizontal/vertical propagation modes and ultimately a direction of circular polarization from among left-hand circular polarization (LHCP) and right-hand circular polarization (RHCP) at an output of a corresponding polarizer port. FIG. 4 illustrates end view 403-404 of polarizer ports (i.e., looking down section 130 from port 154 in FIG. 1). The configuration in view 400 produces a LHCP output signal, while the configuration in view 401 produces a RHCP output signal. Thus, twist shapes 430 and 440 act as power splitters. When an input signal has energy in one polarization, twist shapes 430 and 440 splits the power roughly equally among H and V modes for introduction into a circular waveguide of a polarizer.

Figure 5:
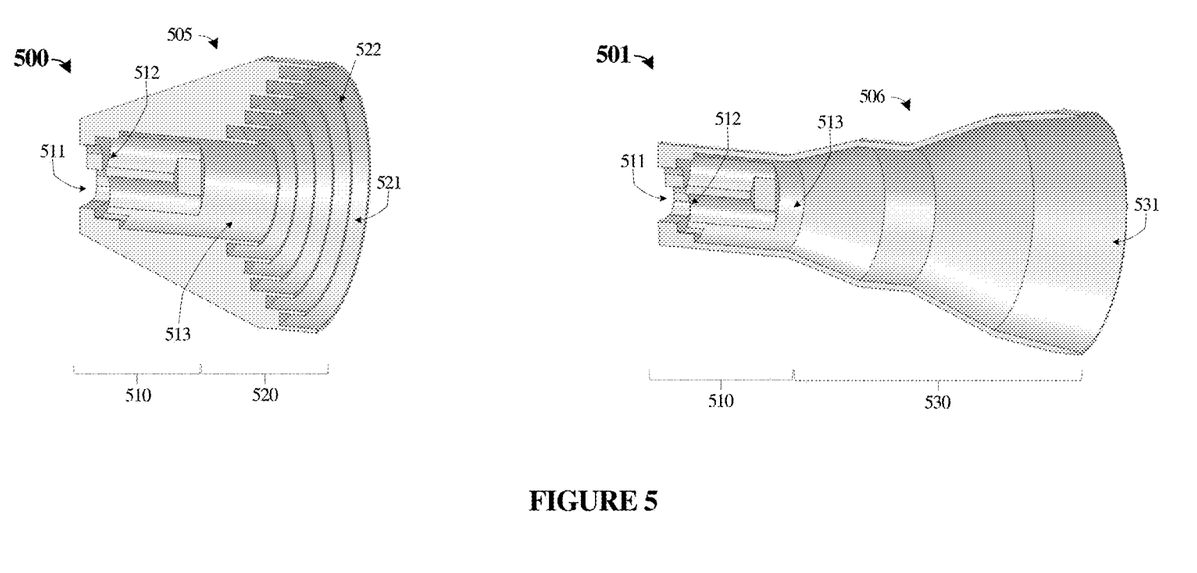
FIG. 5 illustrates horn antenna assemblies in an implementation.

FIG. 5 illustrates horn antenna assemblies 505 and 506 in an implementation of a radio frequency feed structure. View 500 is a side cross-sectional view of horn antenna assembly 505, and view 501 is a side cross-sectional view of horn antenna assembly 506. Polarizer feed 510 includes a "twist" section proximate to port 511 as noted above in FIGS. 1-4.

Horn antenna assembly 505 comprises a polarizer feed 510 with axially corrugated horn antenna element 520. Horn antenna assembly 505 includes rear port 511, twist port 512, polarizer port 513, and aperture 521. During transmission operations, RF signals can be introduced to rear port 511 for transmission by aperture 521. During receive operations, RF signals can be received at aperture 521 for delivery to rear port 511. Rear port 511 can further couple to waveguides, coaxial launches, or signal conduits which carry the signals to and from various RF equipment, such as receiver or transmitter equipment (not shown). Sizing provided by rear port 511 can accommodate standardized or custom waveguide sizes, such as those discussed herein. Horn antenna assembly 505 is fully integrated from a single workpiece and can be manufactured via standard end mills and lathing processes. Other manufacturing techniques discussed herein can alternatively be employed.

Horn antenna assembly 506 comprises polarizer feed 510 with high efficiency multi-flare horn antenna element 530. Horn antenna assembly 506 includes rear port 511, twist port 512, polarizer port 513, and aperture 531. During transmission operations, RF signals can be introduced to rear port 511 for transmission by aperture 531. During receive operations, RF signals can be received at aperture 531 for delivery to rear port 511. Rear port 511 can further couple to waveguides, coaxial launches, or signal conduits which carry the signals to and from various RF equipment, such as receiver or transmitter equipment (not shown). Sizing provided by rear port 511 can accommodate standardized or custom waveguide sizes, such as those discussed herein. Horn antenna assembly 506 is fully integrated from a single workpiece and can be manufactured via electrical discharge machining (EDM) and lathing processes. Other manufacturing techniques discussed herein can alternatively be employed.

Horn antenna assemblies 505-506 can be formed from metallic workpieces or metal alloys, such as aluminum, copper, silver, gold, magnesium, or other metals and alloys thereof. When non-conductive materials are used to form horn antenna assemblies 505-506, various surface platings, coatings, or other surface treatments can be employed to form a conductive layer at least on RF signal contacting portions, such as interior portions and mating portions. When injection molding techniques are employed, draft angles can be incorporated into the various elements.

Figure 6:
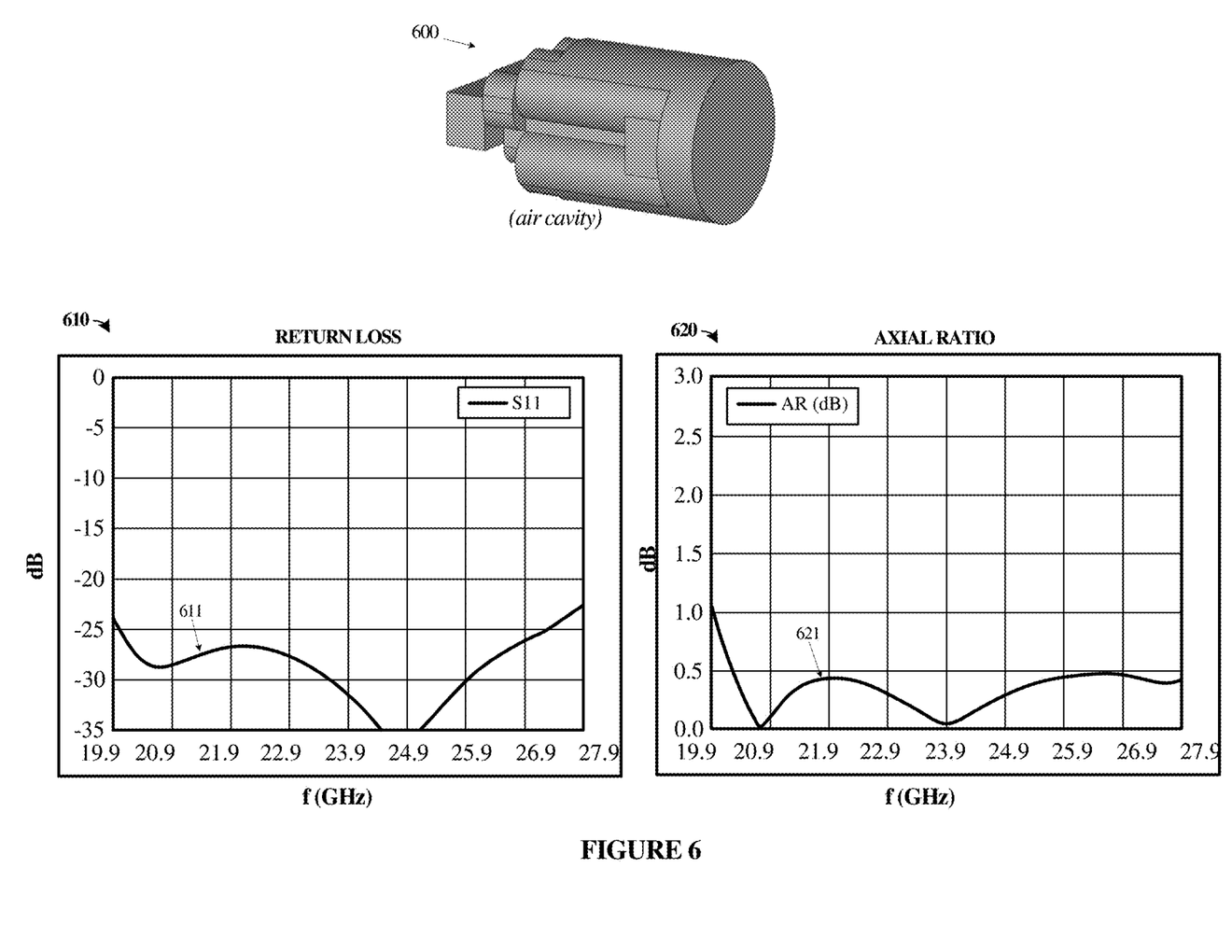
FIG. 6 illustrates performance characteristics of a polarizer feed in an implementation.

FIG. 6 illustrates performance characteristics of polarizer feed 600 in an implementation of a radio frequency feed structure. Graphs 610 and 620 are included which indicate performance over a frequency range included in the microwave K band. The performance characteristics in FIG. 6 relate to performance of polarizer feed 600 with a circular cross-sectional shape. Polarizer feed 600 characterized in FIG. 6 can be that of polarizer feed 105 discussed herein, if sized for the appropriate frequency band. It should be noted that graphs 610 and 620 indicate simulated data for the polarizer section alone without including a horn aperture. A horn aperture can slightly degrade the axial ratio performance offered by the polarizer section alone.

Graph 610 includes a vertical axis indicating return loss (in dB) and a horizontal axis indicating frequency in GHz. Curve 611 in graph 610 shows return loss performance over a selected frequency range. Graph 620 includes a vertical axis indicating axial ratio (in dB) and a horizontal axis indicating frequency in GHz. Curve 621 in graph 620 shows axial ratio performance over the selected frequency range. Thus, the graphs in FIG. 6 show the corresponding polarizer achieves up to 35% bandwidth performance with reduced length as compared to the other styles of polarizers, such as traditional loaded septum polarizers, while decreasing aperture mass and improving performance.

Figure 7:
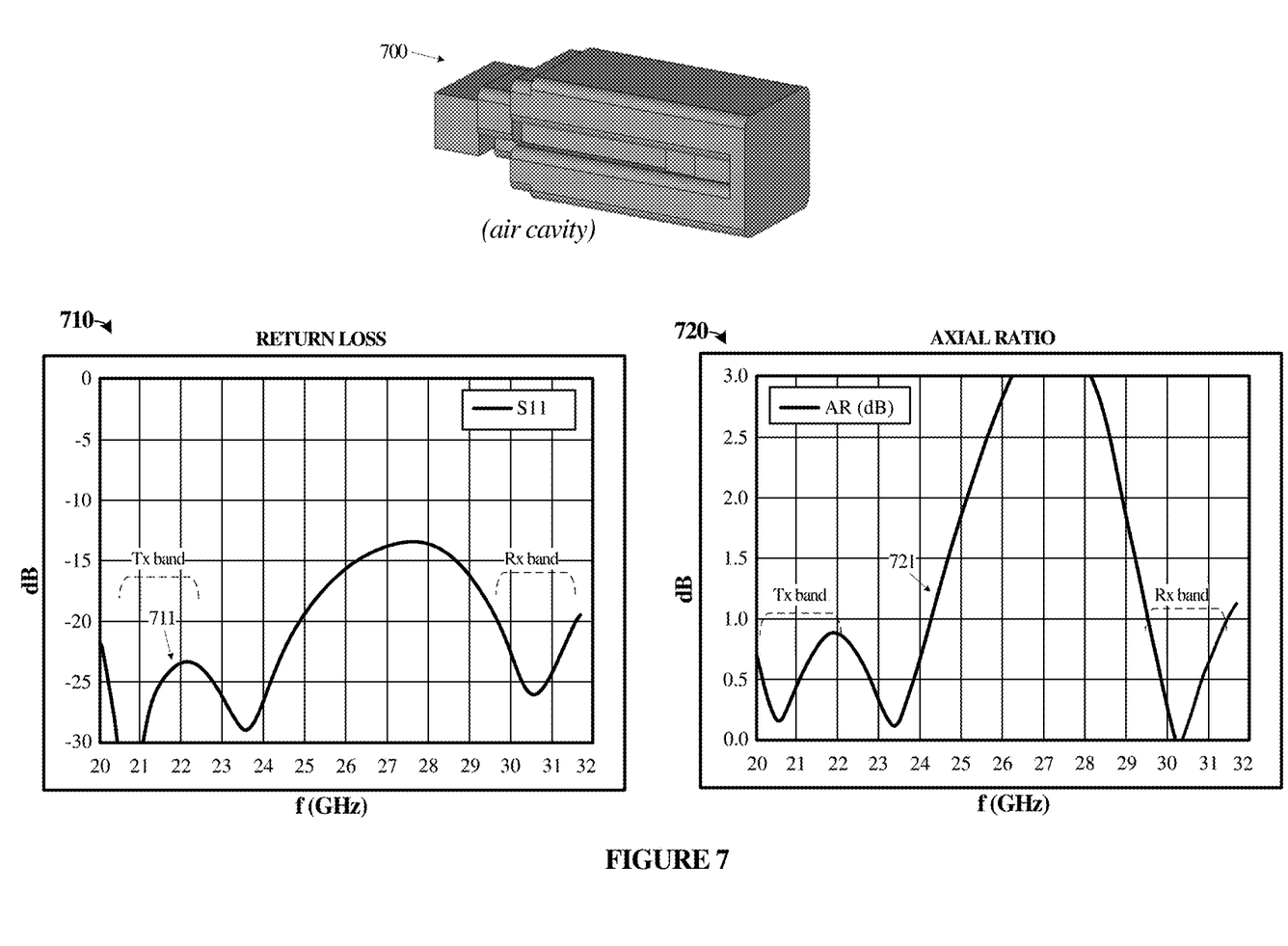
FIG. 7 illustrates performance characteristics of a polarizer feed in an implementation.

FIG. 7 illustrates additional performance characteristics of a polarizer feed in an implementation of a radio frequency feed structure. Graphs 710 and 720 are included which indicate performance over a frequency range included in the microwave K band. The performance characteristics in FIG. 7 relate to performance of polarizer feed 700 with a square cross-sectional shape and WR-34 waveguide feed interface. Polarizer feed 700 characterized in FIG. 7 can have similar features to that of polarizer feed 105, albeit for a square feed and if sized for the appropriate frequency band. When deployed into an array, a square horn can have better aperture density for the same unit cell size as compared to other horn types, namely circular.

Graph 710 includes a vertical axis indicating return loss (in dB) and a horizontal axis indicating frequency in GHz. Curve 711 in graph 610 shows return loss performance over a selected frequency range. Graph 720 includes a vertical axis indicating axial ratio (in dB) and a horizontal axis indicating frequency in GHz. Curve 721 in graph 720 shows axial ratio performance over the selected frequency range.

Thus, the graphs in FIG. 7 show the corresponding polarizer achieves a 45% bandwidth performance with reduced length as compared to the other styles of polarizers, such as traditional loaded septum polarizers, while decreasing aperture mass and improving performance. Typically, the length of polarizer 700 is longer than polarizer 600 for a given frequency range. Example Tx (transmit) and Rx (receive) bands are shown with corresponding performance. For example, a Tx band might be 20.2 to 21.2 GHZ, and an Rx band might be 30.0 to 31.0 GHz. The use of Tx and Rx might change depending on the endpoint of the communication node.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:
   a first waveguide segment spanning a longitudinal axis between a feed port and a twist port, wherein the first waveguide segment comprises two stacked rounded rectangular elements skewed in minor axis alignment with respect to each other and having major axes perpendicular to the longitudinal axis; and
   a second waveguide segment spanning the longitudinal axis between the twist port and a polarizer port and coupled to the first waveguide segment at the twist port, wherein the second waveguide segment comprises first ridge elements that span longitudinally from the twist port on first opposing walls of the second waveguide segment, and second ridge elements that span longitudinally from the twist port on second opposing walls of the second waveguide segment.

2. The apparatus of claim 1, wherein a polarization of an emitted radio frequency signal is altered from a first polarization state at the feed port to a second polarization state at the polarizer port.

3. The apparatus of claim 2, wherein the first polarization state comprises a linear polarization and the second polarization state comprises a circular polarization.

4. The apparatus of claim 1, wherein a polarization of a received radio frequency signal is altered from a first polarization state at the polarizer port to a second polarization state at the feed port.

5. The apparatus of claim 1, wherein the two stacked rounded rectangular elements of the first waveguide segment establish an approximately equal power split between radio frequency signals transiting the twist port into the second waveguide segment.

6. The apparatus of claim 1, wherein the first ridge elements taper down in associated protrusion depth to the first opposing walls of the second waveguide segment at a longitudinal length shorter than the second ridge elements taper down in associated protrusion depth to the second opposing walls.

7. The apparatus of claim 1, comprising:
   a horn element coupled to the polarizer port, wherein the horn element comprises a horn aperture.

8. The apparatus of claim 1, wherein the first waveguide segment and the second waveguide segment are formed from a single workpiece of material.

9. The apparatus of claim 1, wherein the first waveguide segment and the second waveguide segment are machined from a single workpiece of material.

10. The apparatus of claim 1, wherein the polarizer port comprises a generally circular cross-sectional shape, and wherein the feed port comprises a rectangular cross-sectional shape conforming to a standardized waveguide type.

11. A method, comprising:
    forming a first waveguide segment spanning a longitudinal axis between a feed port and a twist port, wherein the first waveguide segment comprises two stacked rounded rectangular elements skewed in minor axis alignment with respect to each other and having major axes perpendicular to the longitudinal axis; and
    forming a second waveguide segment spanning the longitudinal axis between the twist port and a polarizer port and coupled to the first waveguide segment at the twist port, wherein the second waveguide segment comprises first ridge elements that span longitudinally from the twist port on first opposing walls of the second waveguide segment, and second ridge elements that span longitudinally from the twist port on second opposing walls of the second waveguide segment.

12. The method of claim 11, wherein the two stacked rounded rectangular elements of the first waveguide segment are formed to establish an approximately equal power split between radio frequency signals transiting the twist port into the second waveguide segment.

13. The method of claim 11, wherein the first ridge elements are formed to taper down in associated protrusion depth to the first opposing walls of the second waveguide segment at a longitudinal length shorter than the second ridge elements taper down in associated protrusion depth to the second opposing walls.

14. The method of claim 11, comprising:
coupling a horn element to the polarizer port, wherein the horn element comprises a horn aperture.

15. The method of claim 11, wherein the first waveguide segment and the second waveguide segment are formed from a single workpiece of material.

16. The method of claim 11, wherein the first waveguide segment and the second waveguide segment are machined from a single workpiece of material.

17. The method of claim 11, wherein the polarizer port comprises a generally circular cross-sectional shape, and wherein the feed port comprises a rectangular cross-sectional shape conforming to a standardized waveguide type.

18. A radio frequency feed structure, comprising:
a horn element coupled to a polarizer port of a polarizer feed and establishing a horn aperture;
a coaxial feed element coupled to a feed port of the polarizer feed and configured to interface between a coaxial link and a waveguide of the polarizer feed; and
the polarizer feed comprising:
a first waveguide segment spanning a longitudinal axis between the feed port and a twist port, wherein the first waveguide segment comprises two stacked rounded rectangular elements skewed in minor axis alignment with respect to each other and having major axes perpendicular to the longitudinal axis; and
a second waveguide segment spanning the longitudinal axis between the twist port and the polarizer port and coupled to the first waveguide segment at the twist port, wherein the second waveguide segment comprises first ridge elements that span longitudinally from the twist port on first opposing walls of the second waveguide segment, and second ridge elements that span longitudinally from the twist port on second opposing walls of the second waveguide segment.

19. The radio frequency feed structure of claim 18, wherein a polarization of an emitted radio frequency signal is altered from a first polarization state at the feed port to a second polarization state at the polarizer port; and
wherein the first polarization state comprises a linear polarization and the second polarization state comprises a circular polarization.

20. The radio frequency feed structure of claim 18, wherein the two stacked rounded rectangular elements of the first waveguide segment establish an approximately equal power split between radio frequency signals transiting the twist port into the second waveguide segment; and
wherein the first ridge elements taper down in associated protrusion depth to the first opposing walls of the second waveguide segment at a longitudinal length shorter than the second ridge elements taper down in associated protrusion depth to the second opposing walls.

* * * * *